United States Patent
Booth et al.

(10) Patent No.: US 11,519,297 B2
(45) Date of Patent: Dec. 6, 2022

(54) OIL PIPE ASSEMBLY

(71) Applicant: ROLLS-ROYCE plc, London (GB)

(72) Inventors: Michael Booth, Derby (GB); Andrew Smith, Derby (GB); Ajay Patel, Derby (GB)

(73) Assignee: ROLLS-ROYCE plc, London (GB)

( * ) Notice: Subject to any disclaimer, the term of this patent is extended or adjusted under 35 U.S.C. 154(b) by 325 days.

(21) Appl. No.: 16/828,102

(22) Filed: Mar. 24, 2020

(65) Prior Publication Data
US 2020/0318493 A1    Oct. 8, 2020

(30) Foreign Application Priority Data

Apr. 3, 2019    (GB) .................................... 1904677

(51) Int. Cl.
*F01D 25/18*    (2006.01)
*F01M 1/10*    (2006.01)
(Continued)

(52) U.S. Cl.
CPC ............. *F01D 25/18* (2013.01); *F01D 9/065* (2013.01); *F01M 1/10* (2013.01); *F01M 1/20* (2013.01);
(Continued)

(58) Field of Classification Search
CPC .......... F01D 25/18; F01D 9/065; F01D 25/20; F01D 25/16; F01M 1/10; F01M 1/20;
(Continued)

(56) References Cited

U.S. PATENT DOCUMENTS 4,185,462 A * 1/1980 Morse, II ................ F16L 55/00
60/761
4,384,557 A * 5/1983 Johnson ............... F02M 55/005
123/468
(Continued)

FOREIGN PATENT DOCUMENTS

EP    2042691 A2    4/2009
EP    2 425 906 A1    3/2012
(Continued)

OTHER PUBLICATIONS

Aug. 10, 2020 extended Search Report issued in European Patent Application No. 20162607.4.
(Continued)

*Primary Examiner* — Kenneth Bomberg
*Assistant Examiner* — Adam W Brown
(74) *Attorney, Agent, or Firm* — Oliff PLC

(57) ABSTRACT

An oil pipe assembly for a gas turbine engine. The oil pipe assembly includes a first pipe that defines a first fluid passage between an oil supply and a bearing chamber, and a second pipe that houses the first pipe and defines a second fluid passage between the first pipe and the second pipe that is supplied with cooling air. The oil pipe assembly also includes a restrictor that extends from the second pipe and restricts the passage of fluid from the second fluid passage before it flows into a breather. Pressure and temperature sensors) are located adjacent the restrictor to detect and measure changes in air pressure and air temperature adjacent the restrictor from which a controller identifies whether a leak has occurred in the first pipe or the second pipe. A method for detecting a leak in the oil pipe assembly, and a gas turbine are also described.

8 Claims, 4 Drawing Sheets

(51) Int. Cl.
*F01M 1/20* (2006.01)
*F01D 9/06* (2006.01)

(52) U.S. Cl.
CPC .... *F05D 2220/323* (2013.01); *F05D 2260/80* (2013.01); *F05D 2260/98* (2013.01); *F05D 2270/301* (2013.01); *F05D 2270/303* (2013.01)

(58) Field of Classification Search
CPC ............ F05D 2260/80; F05D 2260/98; F05D 2270/301; F05D 2270/303; F05D 2220/323; F16H 57/0435; F16H 57/0413; F16H 1/32; F16H 57/023; F16H 57/082; F16H 2001/327; Y02T 50/60; G01M 3/283; F02C 7/06; F04D 25/08; F04D 29/023; F04D 29/34; F04D 29/388; F17D 5/00; F17D 5/02
See application file for complete search history.

(56) References Cited

U.S. PATENT DOCUMENTS

| | | | | |
|---|---|---|---|---|
| 4,708,371 | A * | 11/1987 | Elsworth | F16L 37/56 285/120.1 |
| 5,107,676 | A * | 4/1992 | Hadaway | F16H 57/0482 60/39.08 |
| 6,102,577 | A * | 8/2000 | Tremaine | F01D 25/186 184/104.1 |
| 6,438,938 | B1 * | 8/2002 | Burkholder | F01D 25/18 60/39.08 |
| 7,134,322 | B1 * | 11/2006 | Baird | G01M 3/38 73/40.7 |
| 7,305,830 | B2 * | 12/2007 | Fish | F02C 7/222 285/124.1 |
| 8,272,455 | B2 | 9/2012 | Guimerans et al. | |
| 8,410,946 | B2 * | 4/2013 | Ansari | G01M 3/002 340/622 |
| 8,621,839 | B2 * | 1/2014 | Alecu | F01D 25/20 60/39.08 |
| 8,944,749 | B2 * | 2/2015 | Durocher | F02C 7/24 415/168.1 |
| 9,022,109 | B2 | 5/2015 | Nguyen | |
| 9,399,905 | B2 | 7/2016 | Nguyen | |
| 9,644,495 | B2 * | 5/2017 | Zurmehly | F01D 25/18 |
| 9,932,898 | B2 * | 4/2018 | Milne | F16C 33/1025 |
| 10,365,178 | B2 * | 7/2019 | Ling | G01M 3/165 |
| 10,400,623 | B2 * | 9/2019 | Everwyn | G01M 3/025 |
| 10,697,370 | B2 * | 6/2020 | McKenney | F02C 7/06 |
| 10,801,653 | B2 * | 10/2020 | Godfrey | B22F 3/24 |
| 10,914,653 | B2 * | 2/2021 | Israelsen | H04N 5/33 |
| 2009/0079185 | A1 | 3/2009 | Carbines-Evans et al. | |
| 2011/0215936 | A1 * | 9/2011 | Ansari | G01M 3/002 340/584 |
| 2012/0060508 | A1 * | 3/2012 | Alecu | F01D 25/20 60/39.08 |
| 2015/0052872 | A1 * | 2/2015 | Zurmehly | F01D 25/145 60/39.83 |
| 2018/0128122 | A1 * | 5/2018 | Avis | F01D 25/32 |
| 2018/0252116 | A1 * | 9/2018 | Ahumada Parás | F01D 21/003 |
| 2019/0226404 | A1 * | 7/2019 | Bellis | F02C 7/25 |

FOREIGN PATENT DOCUMENTS

| | | |
|---|---|---|
| EP | 2 634 380 A1 | 9/2013 |
| WO | 2010/098674 A | 9/2010 |

OTHER PUBLICATIONS

Search Report of the Intellectual Property Office of the United Kingdom for GB1904677.0 with search date of Oct. 7, 2019.

* cited by examiner

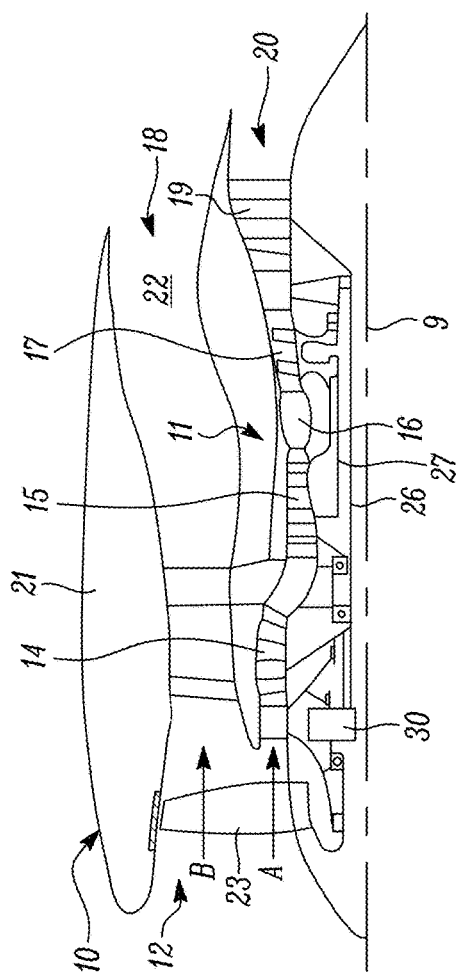
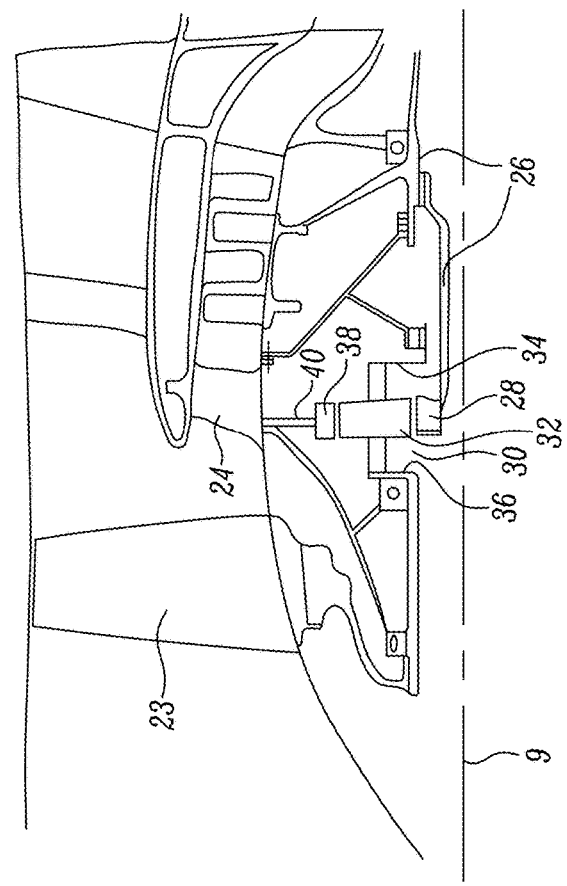

OIL PIPE ASSEMBLY

CROSS-REFERENCE TO RELATED APPLICATIONS

This specification is based upon and claims the benefit of priority from United Kingdom patent application number GB 1904677.0 filed on Apr. 3 2019, the entire contents of which is incorporated herein by reference.

BACKGROUND

Field of the Disclosure

The present disclosure relates to an oil pipe assembly. More particularly, the present disclosure provides an oil pipe assembly that is useful, for example, in the gas turbine engine of an aircraft by detecting when it has leaked, burst or otherwise failed and is able to at least minimise the consequences of that failure, for example to prevent a fire or other engine or component malfunction.

Description of the Related Art

Gas turbine engine oil systems are in general full flow re-circulatory systems that must provide for adequate lubrication and cooling of all engine bearings, gears and drive splines under all foreseeable operating conditions. A complete oil system will tend to be divided into three primary areas: a) feed oil and cooling; b) return oil; c) vent, de-aeration and breather system. In each area, oil (or an oil-air mixture) is transferred across air flow paths within the engine. To minimise the risk of ignition, any oil-air mixture needs to be kept below the auto-ignition temperature.

The oil system of a gas turbine engine typically includes a variety of piping. It is highly desirable that any single leak in that piping will not disrupt the supply of oil to the engine, especially to bearings that need to remaining well-lubricated to perform optimally and minimise any wearing. Certain oil leaks can also pose fire hazards.

There is therefore a need to provide an oil pipe assembly that detect oil pipe failures and where possible can contain any failures at least until suitable repairs can be made. The need can be acute in the gas turbine engines of aircraft, especially those used for civil aviation where the aircraft is often transporting large numbers of people for long distances. The safety of passengers and crew is always paramount. Furthermore redirecting a flight to undertake a critical repair to oil piping will severely disrupt their travelling and often leave the airline and travel insurers with significant costs.

European patent application EP 2042691 A2 discloses using a doubled-skinned pipe to supply lubricant supply in gas turbine engines. An oil pipe is connected directly into a receiving manifold for supplying oil to an internal bearing chamber, the pipe being surrounded by a secondary containment member sealed at the inner manifold end and open at its other end in a relatively safe zone where leaked fluid will be observable. The arrangement reduces the risk of an oil leak, as any leaks will tend to be transmitted to a zone where the possibility of ignition is much reduced.

The present disclosure provides an oil pipe assembly that provides at least a useful alternative to known oil pipe assemblies.

SUMMARY OF THE DISCLOSURE

In a first aspect, there is provided an oil pipe assembly for a gas turbine engine having an oil system, the oil pipe assembly comprising: a first pipe defining a first fluid passage between an oil supply and a bearing chamber of the gas turbine engine; a second pipe that houses the first pipe and defines a second fluid passage between the first pipe and the second pipe that is supplied with cooling air; a restrictor that extends from the second pipe and restricts the passage of fluid from the second fluid passage before it flows into a breather of the gas turbine engine; a pressure sensor and a temperature sensor which are located adjacent the restrictor to detect and measure changes in air pressure and air temperature adjacent the restrictor; and a controller that signals that a leak has occurred in the first pipe or the second pipe when the pressure sensor and the temperature sensor detect an increase in air pressure and air temperature adjacent the restrictor.

The oil pipe assembly ensures a leak along any portion of the first pipe or the second pipe in a largely inaccessible, hot and pressurised part of the engine will create a high pressure and temperature event that is localised and readily detected in a part of the engine where the temperature and pressure is generally approaching atmospheric temperature and pressure.

The oil pipe assembly may contain a pipe failure until suitable repairs can be made. It is highly desirable that any single leak in that piping will not disrupt the supply of oil to the engine, it will not pose a fire hazard, and it will not require the aircraft to be diverted to seek urgent repairs.

The oil pipe assembly may be configured so that if the first pipe leaks, oil from the first pipe flows into a cavity and is recovered and fed back into the oil system of the gas turbine engine.

The oil pipe assembly may be configured so that if the second pipe leaks, air from the second pipe flows into the breather and is vented overboard.

The restrictor may be an elongate element that includes a restrictor fluid passage where the average diameter of the restrictor fluid passage is smaller than the average diameter of the second fluid passage.

The controller may determine the location of the leak from changes in pressure and temperature measurements adjacent the restrictor.

In a second aspect, there is provided a method for detecting a leak in an oil pipe of a gas turbine engine, the method comprising the steps of: (a) providing the oil pipe assembly of the first aspect; (b) detecting and measuring any changes in air pressure and air temperature adjacent the restrictor of the oil pipe assembly; and (c) signalling that a leak has occurred in the first pipe or the second pipe of the oil pipe assembly when the pressure sensor and the temperature sensor of the oil pipe assembly detect an increase in air pressure and air temperature adjacent the restrictor.

The method may of further comprise identifying from the pressure and air temperature measurements whether a leak has occurred in the first pipe or the second pipe.

The method may further comprise identifying from the pressure and air temperature measurements whether, and if so, where a leak has occurred in the first pipe or the second pipe.

In a third aspect, there is provided a gas turbine engine that includes the oil pipe assembly of the first aspect.

The gas turbine engine may comprise an engine core comprising a turbine, a compressor, and a core shaft connecting the turbine to the compressor; a fan located upstream of the engine core, the fan comprising a plurality of fan blades; and a gearbox that receives an input from the core shaft and outputs drive to the fan so as to drive the fan at a lower rotational speed than the core shaft.

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane (NGV). At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 degrees C. Purely by way of further example, the cruise conditions may correspond to: a forward Mach number of 0.85; a pressure of 24000 Pa; and a temperature of −54 degrees C. (which may be standard atmospheric conditions at 35000 ft).

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which:

FIG. 1 is a sectional side view of a gas turbine engine;

FIG. 2 is a close up sectional side view of an upstream portion of the gas turbine engine shown in FIG. 1;

DETAILED DESCRIPTION OF THE DISCLOSURE

Figure 3:
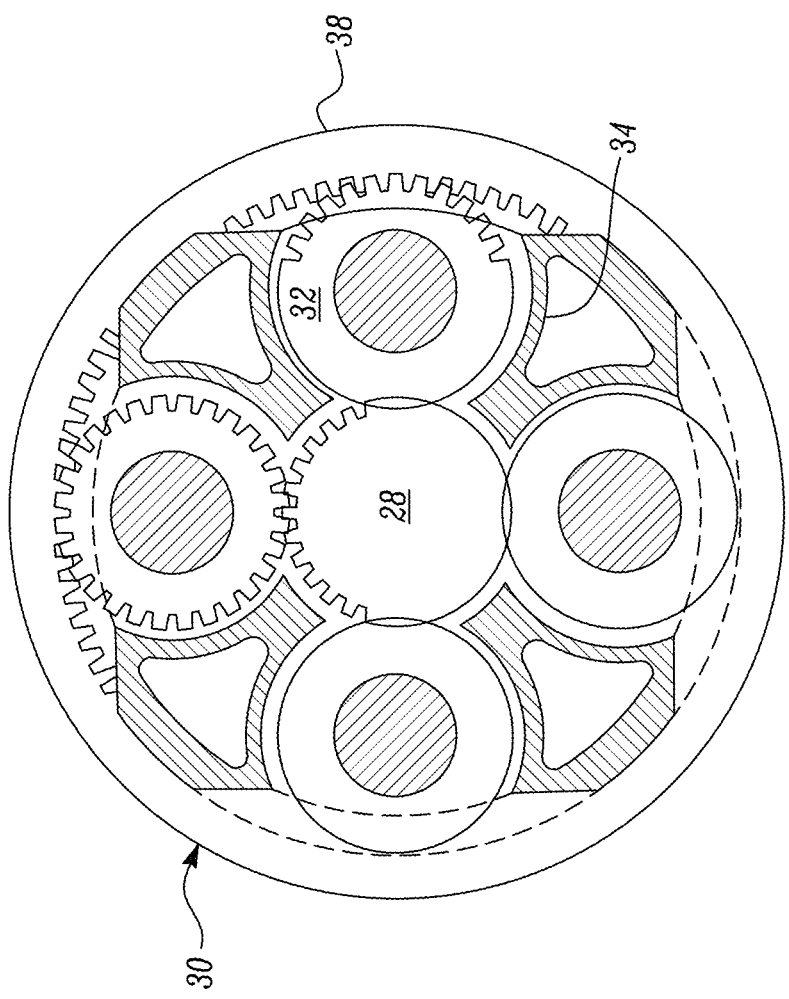
FIG. 3 is a partially cut-away view of a gearbox for the gas turbine engine shown in FIGS. 1 and 2.

Aspects and embodiments of the present disclosure will now be discussed with reference to the accompanying figures. Further aspects and embodiments will be apparent to those skilled in the art.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 27 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Turning now more specifically to the oil pipe assembly of the present disclosure that may, for example, be used in such a gas turbine. An embodiment of the oil pipe assembly is described with reference to FIG. 4 of the drawings.

Figure 4:
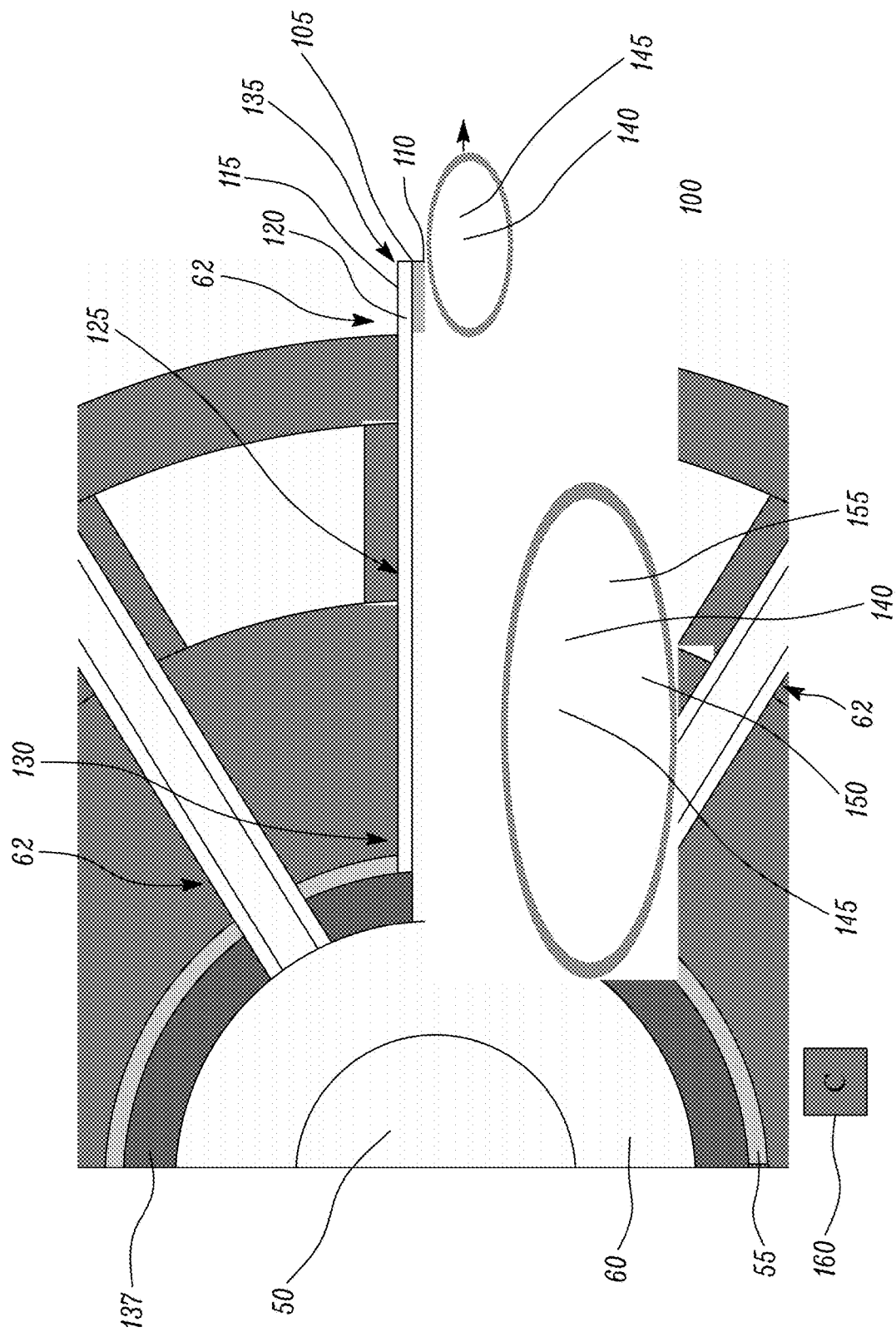
FIG. 4 is a schematic sectional view of a journal bearing of the gas turbine engine shown in FIGS. 1 to 3 that is lubricated by oil provided by several double skin oil pipes. It shows the oil pipe assembly of the present disclosure.

FIG. 4 is a schematic sectional view of a journal bearing 50 of a gas turbine engine 10 of a geared turbofan aircraft such as that described above. The journal bearing 50 is housed in a bearing chamber 55 and kept lubricated by being supplied with oil 60 supplied by one or more oil supplies (not shown) in the gas turbine engine via one or more oil pipe assemblies 100 of the present disclosure. FIG. 4 shows three such oil pipe assemblies, two only partially, however journal bearings are typically fed with oil from a plurality of oil pipe assemblies that circumferentially surround the bearing chamber 55.

The oil pipe assembly 100 of the present disclosure can be provided to each oil pipe 62 that supplies a journal bearing 50 (or other type of oil-lubricated bearing).

The oil pipe assembly 100 has a first pipe 105 that defines a first fluid passage 110 that connects an oil supply (not shown) to a bearing chamber 55. The first fluid passage 110 is primarily intended to be an oil passage. A second pipe 115 houses the first pipe 105 and forms a second fluid passage 120 between the first pipe 105 (more particularly the external surface of the first pipe 105) and the second pipe 115 (more particularly the inner surface of the second pipe 115) thereby forming a double skin pipe 125. That double skin pipe has a first end 130 that is oriented towards the bearing chamber 55 and a second end 135 that is oriented away from the bearing chamber 55. Cooling air 137 enters the first end 130 of the double skin pipe 125 and is flows to the second end 135 of the double skin pipe 125 via the second fluid passage 120. The second fluid passage 120 is primarily intended to be an air passage.

A restrictor 140 extends from the second end 135 of the double skin pipe 125 and restricts or reduces the passage of fluid from the second fluid passage 120. The restrictor can take a variety of forms, for example it may be an elongate element that includes a restrictor fluid passage 145 where the average diameter of the restrictor fluid passage is smaller than the average diameter of the second fluid passage 120. The restrictor 140 may be substantially cylindrical. The restrictor fluid passage 145 may also be substantially cylindrical. The purpose of this restrictor 140 will be explained below. A pressure sensor 150 and a temperature sensor 155 are located adjacent the restrictor 140.

The pressure sensor 150 is provided to detect and measure changes in air pressure adjacent the restrictor 140. The pressure sensor can take various forms that are suitable for the purpose and is located and configured accordingly.

The temperature sensor 155 is provided to detect and measure changes in air temperature adjacent the restrictor 140. The temperature sensor can take various forms that are suitable for the purpose and is located and configured accordingly.

The oil pipe assembly 100 of the present disclosure also has a controller 160, which may by located adjacent the pressure sensor 150 and the temperature sensor 155 or may be suitably located elsewhere in the engine. The controller receives air pressure and air temperature data from the pressure sensor 150 and the temperature sensor 155 respectively. It interprets certain changes in those data as indicating the oil pipe assembly has leaked, burst or otherwise failed. And when any such failure is noted, the controller 160 provides a suitable warning signal to the cockpit, typically via the Electronic Engine Controller (EEC).

The controller can have various forms. In certain embodiments the may include a processor (not shown) and a memory (not shown), which may be in communication with each other. The memory may include computer executable instructions that are executable by the processor to perform the logic of the controller. As another example, the oil pipe assembly may include an analogue to digital converter to process signals from the pressure sensor 150 and/or the temperature sensor 155. The controller may be communicably coupled to the pressure sensor and/or the temperature sensor by wired connections and/or wireless connections.

The processor may be in communication with a user interface that may indicate to an operator values of various parameters associated with the oil pipe assembly.

The processor may be any device that performs logic operations. The processor may include a general processor, a central processing unit, an application specific integrated circuit (ASIC), a digital signal processor, a field programmable gate array (FPGA), a digital circuit, an analogue circuit, a controller, a microcontroller, any other type of processor, or any combination thereof. The processor may include one or more components operable to execute computer executable instructions or computer code embodied in the memory.

The logic of the controller 160 may be implemented in one or more modules comprising hardware or a combination of hardware and software. For example, each module may include an application specific integrated circuit (ASIC), a Field Programmable Gate Array (FPGA), a circuit, a digital logic circuit, an analogue circuit, a combination of discrete circuits, gates, or any other type of hardware or combination thereof. Alternatively or in addition, each module may include memory hardware, such as a portion of the memory, for example, that comprises instructions executable with the processor or other processor to implement one or more of the features of the module. Some of the features of the controller may be stored in a computer readable storage medium (for example, as logic implemented as computer executable instructions or as data structures in memory).

The processing capability of the controller may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL)).

The construction and configuration of the restrictor 140 with respect to the double skin pipe 125, the pressure sensor 150 and/or the temperature sensor 155 interact in the operation of the oil pipe assembly 100 of the present disclosure. The oil pipe assembly 100 is configured so that if either the first pipe 105 or the second pipe 115 leaks, bursts or otherwise fails at any point along their respective lengths, the temperature and pressure will build in the double skin pipe 125 towards the restrictor 140 and these increases will be detected by the pressure and temperature sensors 150, 155 and the controller 160 will signal any appropriate warning. In this way the oil pipe assembly ensures a leak along any portion of the first pipe 105 or the second pipe 115 in a largely inaccessible, hot and pressurised part of the engine will create a high pressure and temperature event that is localised and readily detected in a part of the engine where the temperature and pressure is generally approaching atmospheric temperature and pressure.

Detecting changes in both pressure and temperature enables the oil pipe assembly 100 to differentiate between a failure in the first pipe 105 and/or a failure in the second pipe 115. Measuring a change in temperature alone adjacent the restrictor 140 would enable the oil pipe assembly to detect a pipe failure but in most cases it would not be apparent whether the failure occurred in the first pipe 105 or the failure occurred in the second pipe 115. Similarly measuring a change in pressure alone adjacent the restrictor 140 would enable the system to detect a pipe failure but in most cases it would not be apparent whether the failure occurred in the first pipe 105 or the failure occurred in the second pipe 115, especially at certain points of a flight there can be minimal differences between buffer and scavenge oil pressure. The combination of pressure and temperature measurements can even indicate the location of the leak in either the first pipe 105 or the second pipe 115.

As mentioned above the oil pipe assembly 100 of the present disclosure may contain a pipe failure until suitable repairs can be made. It is highly desirable that any single leak in that piping will not disrupt the supply of oil to the engine, it will not pose a fire hazard, and it will not require the aircraft to be diverted to seek urgent repairs.

If the first pipe 105 leaks, bursts or other fails, oil supply to the bearing chamber 55 will not be disrupted as oil from the first pipe 105 will simply flow into the (intact) second pipe 115 and pass through the second fluid passage 120 towards the second end 135 of the double skin pipe 125 and be recovered and fed back into the oil system of the gas turbine engine 10. The failure will be detected by the oil pipe assembly 100 and identified from the pressure and temperature measurements made by the pressure and temperature sensors 150, 155 as a failure in the first pipe 105. The data may also at least indicate the location of the leak in the first pipe. The first pipe will need to be repaired before the aircraft's next flight but it will not be necessary to divert the current flight to the nearest airport in order to make an emergency repair. By recovering the oil that leaked from the first pipe 105, there should be no reason for the oil system to flag a Low Oil Pressure Warning, which would generally require In-Flight Shutdown (IFSD) i.e. shutting down a gas turbine engine mid-flight. Furthermore, by detecting and resolving an oil leak the oil pipe assembly can prevent a fire starting in the bearing structure of the engine.

If the second pipe 115 leaks, bursts or other fails, oil supply to the bearing chamber 55 will not be disrupted as cooling air from the second pipe 115 will simply flow into a bearing cavity that communicates with a breather (aka an air-oil separator) that vents the air overboard. The failure will be detected by the oil pipe assembly and identified from the pressure and temperature measurements made by the pressure and temperature sensors 150, 155 as a failure in the second pipe 115. The data may also at least indicate the location of the leak in the second pipe. The second pipe will need to be repaired before the aircraft's next flight but it will not be necessary to divert the current flight to the nearest airport in order to make an emergency repair.

In the configuration of the oil pipe assembly shown in FIG. 4 air is supplied to the second fluid passage 120 within the second pipe 115 of the double skin pipe 125 from a suitable source of air, e.g. bled from one of the compressors.

Figure 5:
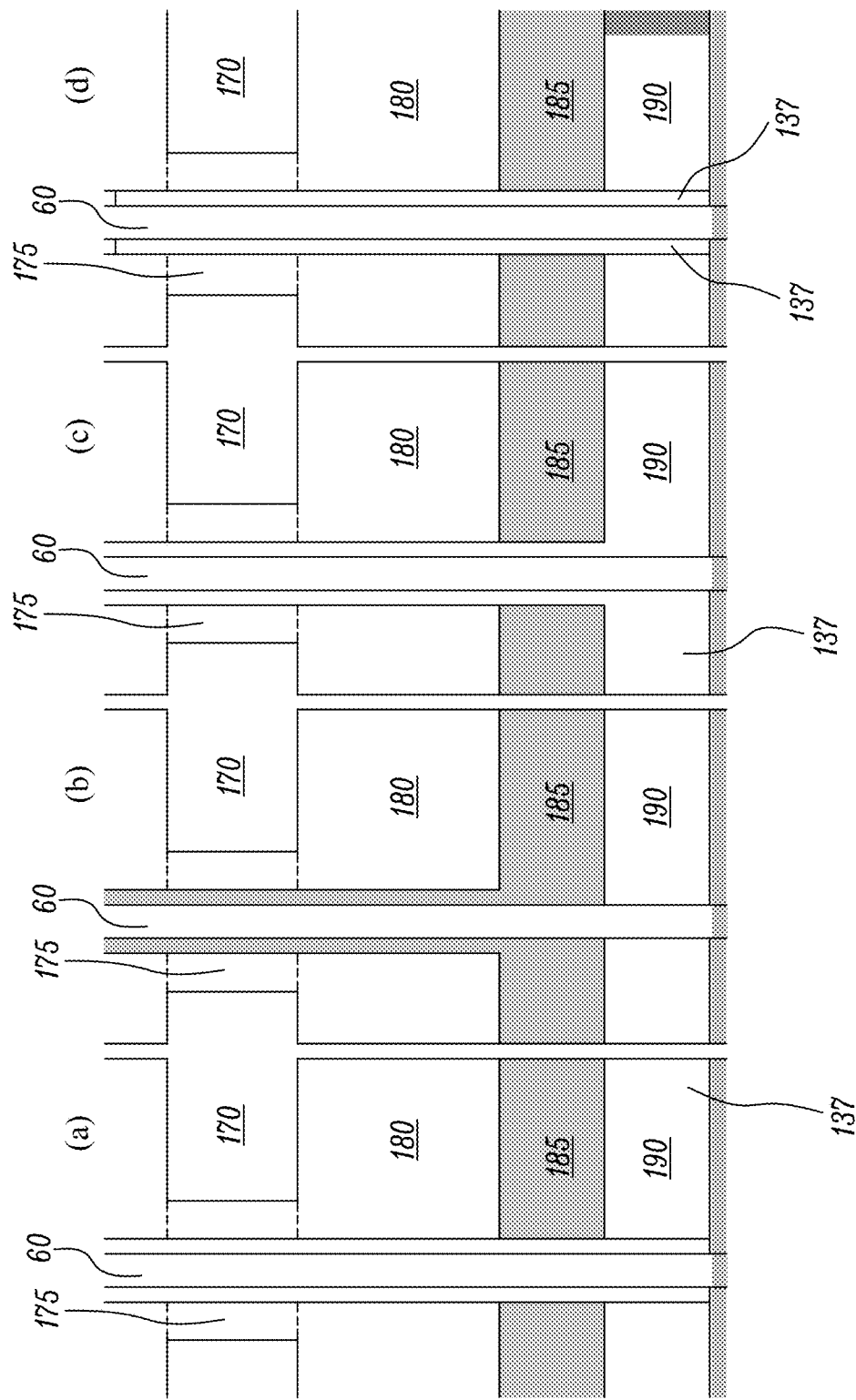
FIG. 5 schematically depicts a variety of configurations by which air can be supplied to the oil pipe assembly of the present disclosure.

FIG. 5 schematically depicts four alternative ways by which cooling air 137 can be supplied to the oil pipe assembly of the present disclosure. From left to right these configurations are conveniently described as (a) Open to Zone, (b) Flowing Hot Vent, (c) Flowing Buffer, and (d) Sealed configurations. These configurations include annuli 170, nozzle guide vanes 175, HP5s 180 containing hot and high pressure air, hot vents 185, and buffers 190 containing cooling air for cooling a bearing chamber.

While the oil pipe assembly of the present disclosure has been described above with reference to its use in a gas turbine engine for an aircraft, more particularly to the supply of oil to the journal bearings of a turbine of a geared turbofan aircraft, the system can be used elsewhere in a wide variety of turbomachinery or indeed other applications that includes an oil pipe. The oil pipe assembly is particularly useful when detecting and ideally containing a leak in an oil pipe where an interruption in the oil supply can impact safety and/or disrupt operations.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An oil pipe assembly comprising:
   a first pipe configured to define a first fluid passage between an oil supply and a bearing chamber of a gas turbine engine;
   a second pipe that houses the first pipe and is configured to define a second fluid passage between the first pipe and the second pipe that is supplied with cooling air;
   a restrictor that extends from the second pipe and is configured to restrict the passage of fluid from the second fluid passage before it flows into a breather of the gas turbine engine;
   a pressure sensor and a temperature sensor which are located adjacent the restrictor to detect and measure changes in air pressure and air temperature adjacent the restrictor; and
   a controller that signals that a leak has occurred in the first pipe or the second pipe when the pressure sensor and the temperature sensor detect an increase in air pressure and air temperature adjacent the restrictor.

2. The oil pipe assembly of claim 1, wherein the oil pipe assembly is configured so that if the first pipe leaks, oil from the first pipe is directed to flow into a cavity so that the oil can be recovered and fed back into an oil system of the gas turbine engine.

3. The oil pipe assembly of claim 1, wherein the oil pipe assembly is configured so that if the second pipe leaks, air from the second pipe is directed to flow into the breather so that the air can be vented overboard.

4. The oil pipe assembly of claim 1, wherein the restrictor is an elongate element that includes a restrictor fluid passage where the average diameter of the restrictor fluid passage is smaller than the average diameter of the second fluid passage.

5. A method for detecting a leak in an oil pipe of a gas turbine engine, the method comprising the steps of:
   (a) providing the oil pipe assembly of claim 1;
   (b) detecting and measuring any changes in air pressure and air temperature adjacent the restrictor of the oil pipe assembly; and
   (c) signalling that a leak has occurred in the first pipe or the second pipe of the oil pipe assembly when the pressure sensor and the temperature sensor of the oil pipe assembly detect an increase in air pressure and air temperature adjacent the restrictor.

6. The method of claim 5, further comprising identifying from the pressure and air temperature measurements whether a leak has occurred in the first pipe or the second pipe.

7. A gas turbine engine that includes the oil pipe assembly of claim 1.

8. The gas turbine engine of claim 7 wherein the gas engine comprises:
   an engine core comprising a turbine, a compressor, and a core shaft connecting the turbine to the compressor;
   a fan located upstream of the engine core, the fan comprising a plurality of fan blades; and
   a gearbox that receives an input from the core shaft and outputs drive to the fan so as to drive the fan at a lower rotational speed than the core shaft.

* * * * *